Patented Feb. 19, 1929.

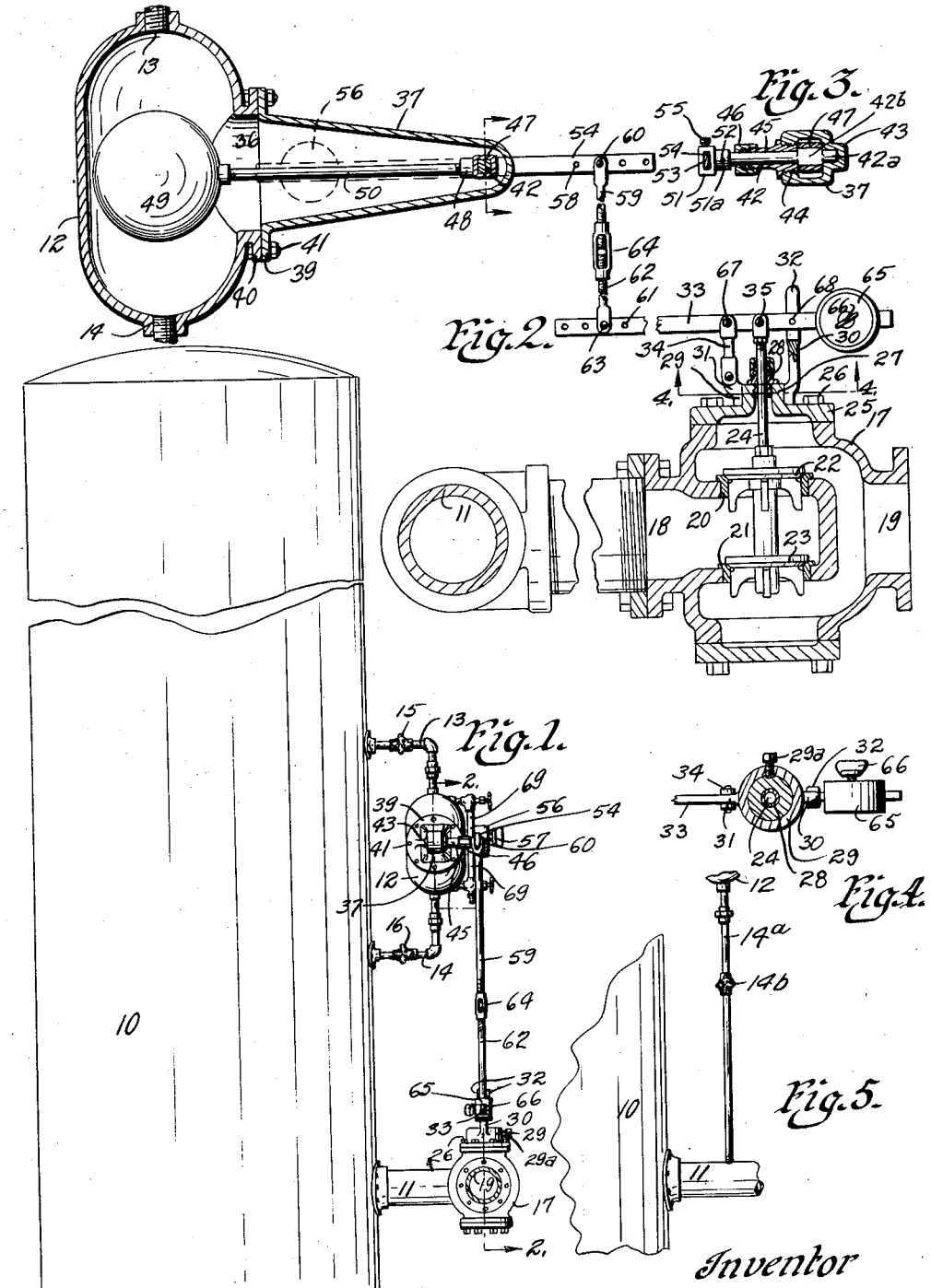

1,702,557

UNITED STATES PATENT OFFICE.

LYLE W. BROWNE, OF MARSHALLTOWN, IOWA, ASSIGNOR TO THE FISHER GOVERNOR COMPANY, OF MARSHALLTOWN, IOWA.

LIQUID-LEVEL CONTROL STRUCTURE.

Application filed December 8, 1924. Serial No. 754,652.

The object of my invention is to provide a liquid level control structure of simple, durable and inexpensive construction, having parts arranged and constructed for convenient mounting on the exterior of a tank or container.

Another purpose is to provide such a structure which can be completed in the factory as a unit, and can then be easily installed at different heights on a vertical tank or a horizontal tank.

A further object is to provide such a structure, which can be readily and easily adjusted for various desired installations.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 shows a side elevation of an installation embodying my invention assembled on a tank.

Figure 2 is a vertical, sectional view through the liquid level control structure unit taken on the line 2—2 of Figure 1.

Figure 3 is a sectional view taken on the line 3—3 of Figure 2.

Figure 4 is a sectional view taken on the line 4—4 of Figure 2; and

Figure 5 is a fragmental elevation of a modified form of the unit.

It is sometimes desirable to provide a liquid level control structure of the float type, which can be conveniently mounted as a unit on the outside of the tank in such manner that no parts project into the tank.

In the drawings filed herewith for illustrating my invention, I have used the reference numeral 10 to indicate a tank or container. Communicating with the tank near the lower part thereof is an inlet or outlet pipe 11.

My float control structure includes a vertically elongated float casing or cage 12. The cage may be mounted at the desired height on the tank by tapping the tank at two points and connecting pipes 13 and 14 with the tank and with the upper and lower ends respectively of the cage 12. Valves 15 and 16 are preferably provided for controlling the flow through the pipes 13 and 14 when necessary, as in cases where the cage is to be removed for any purpose.

For controlling flow through the pipe 11, there is provided a valve having a casing or body 17 having inlet and outlet passages 18 and 19, valve seats 20 and 21, valves 22 and 23, on a common stem 24, for cooperating with the seats. The body 17 has a removable head or cover 25 secured thereto by screw bolts 26.

The cover 25 has an upwardly projecting neck 27 which is internally screw-threaded. The stem 24 extends upwardly through the neck 27 and through a packing gland 28 supported thereon.

Received on the neck 27 is a yoke comprising a collar 29 having on one side an upwardly extending arm 30 and on the other side an upwardly extending shorter arm 31. The collar 29 is adjustably fixed on the neck 27 by means of a set screw 29ª.

The upper end of the arm 30 is bifurcated forming arms 32 to serve as guides for a balance valve lever 33.

A short link 34 is pivoted to the arm 31 and to the lever 33 and the upper end of the stem 24 is pivoted at 35 to the lever 33.

I will now describe the float and the mechanism for connecting it with the valve controlling lever 33.

One side of the float cage 12 has an opening 36. An almost cone-shaped float arm receiving member 37 is closed at its outer end, except for the opening hereinafter mentioned and open at its larger inner end, and is provided with a flange 39 at its open end, secured to the flange 40 of the float cage by bolts 41.

Journaled in the outer end of the member 37 is a rod or shaft 42 shown in Figure 3. The outer end of the member 37 is provided on its interior with a bearing socket 43 shown in Figure 3 to receive the end 42ª of the shaft 42.

A portion of the shaft 42 within the outer end of the member 37 is squared as at 42ᵇ.

At the opposite side of the member 37 from the bearing socket 43 is a screw-threaded opening 44 in which is received a packing nut 45 on which is a packing cap 46

The shaft 42 extends through the nut 45 and cap 46, as shown in Figure 3.

On the squared portion 42ᵇ of the shaft 42 is a sleeve 47 having a squared opening therein to receive the portion 42ᵇ and provided with an internally screw-threaded socket 48. (See Figures 2 and 3.)

In the cage 12 is a copper ball float 49 to which is connected a float arm 50, one end of which is screwed into the socket 48.

On the outer end of the shaft 42 is a fitting 51 having a socket 51ª receiving the end of the shaft 42 and fixed thereto as by means of a pin 52. The fitting 51 has an angular opening 53 therein to adjustably receive a float cage lever 54 angular in cross section.

The float cage lever 54 is adjustably locked in position in the fitting 51 by means of a set screw 55.

It will be seen that the rising and lowering movement of the float 49 will impart tilting movement to the float cage lever 54. The float cage lever 54 projects in both directions from the fitting 55 and has on one end a slidably adjustable balancing weight 56 shown in Figure 1 and in dotted lines in Figure 2. The balancing weight 56 may be adjustably fastened on the float cage lever 54 by means of a set screw 57 shown in Figure 1.

The end of the float cage lever 54 opposite the balancing weight 56 is provided with a series of spaced holes 58.

A turn buckle rod 59 is pivotally connected with the lever 54 by means of a pin or the like 60 extended through one of the holes 58.

The balance valve control lever 33 has at one end a similar series of holes 61. A similar turn-buckle rod 62 similar to the one already described is pivoted to the lever 33 by means of a pin or the like 63 extended through one of the holes 61.

It will be understood that the turn buckle rods 59 and 62 are provided with right and left-hand threads to receive a turn buckle 64.

On the end of the lever 33 opposite the turn buckle rod 62 is mounted a slidably adjustable bearing balancing weight 65. The weight 65 is adjustably secured to the lever 33 by means of a set screw 66 shown in Figure 1.

It will be noted that with the arrangement here illustrated, when the ball 49 is raised by the liquid in the cage 12, the lever 54 will be actuated to lower the turn buckle structure for tilting the lever 33 and raising and opening the valves.

By simply disconnecting the link 34 from the lever 33, by removing the pin 67 and by disconnecting the stem 24, by removing the pin 35, it is then possible to lift the lever 33 from between the arms 32, loosen the set screw 29ª, and turn the collar 29 half way round.

The lever 33 has a hole 68 as shown in Figure 2 so that when the yoke structure is reversed, as has just been suggested, the link 34 may be connected with the lever 33 by extending the pin 67 through the hole 68 and thereupon the rising movement of the float 49 will close the valves.

This is of some importance, insomuch as it makes it possible by a very slight adjustment of the parts to control flow from the tank according to the height of the liquid therein or to control the flow into the tank according to the height of the liquid therein.

It may be noted that a sight glass liquid gage structure 69 may be mounted on the cage 12 if it is desired.

The operation of the device herein described is obvious from the description of the parts.

When the level of the liquid in the main tank rises, the float 49 rises and thus actuates the valves either for opening or closing them depending upon the manner of originally installing the yoke having the collar 29.

Similarly when the liquid level lowers, the float 49 is lowered and the valves are correspondingly actuated.

Sometimes the liquid in the main tank carries sediment and if desired the pipe 14 instead of being connected directly with the tank 10, as illustrated in Figure 2 may be omitted, and a pipe 14ª, as shown in Figure 5 substituted.

The pipe 14ª extends from the lower end of the cage 12 to the outlet or inlet pipe 11 and is provided with a control valve 14ᵇ.

A device of this kind can be used for a great variety of purposes and has a number of advantages.

The valve is placed in the pipe line in which it is desired to control the flow of liquid or it can be used in a pipe line to control steam supply to a pump or the like according to the level of the liquid accumulated in the tank.

It will be noted that the device while of comparatively simple and substantial construction is capable of a great variety of adjustments for adapting the structure to many purposes and conditions. The operation of the float may be regulated by adjusting the balancing weights 56 and 65 on the levers 54 and 33.

The valves may be operated for closing movement by upward movement of the float or for opening movement by upward movement of the float depending upon the adjustment of the collar 29 on the neck 27.

It is quite obvious that the parts may be also varied in position for installation upon different kinds of tanks and in different positions on tanks.

For instance, the float cage may be mounted at different heights above or below the valve by simply varying the length of the turn buckle rods 59 and 62.

The float cage may be arranged to make the member 37 project away from the tank or alongside the tank as may be desired by simply adjusting the float cage on the pipes 13 and 14.

The entire structure can be conveniently built as a unit in the factory and stored or shipped as a unit and is easy to install on a tank, because all that is necesasry is to tap the tank twice and mount the pipes 13 and 14 thereon, and to insert the valve body in a pipe line.

Where it is not desirable to have a float structure or float inside the tank, which situation frequently arises, the present device can be installed entirely outside the tank.

Changes may be made in the details of the construction, and arrangement of the parts without departing from the real spirit and purpose of my invention here disclosed, and it is my intention to cover by my claim any modified forms of structure or use of mechanical equivalents which may be reasonably included within its scope.

This application is a companion to my application, Serial No. 754,650, filed December 8, 1924.

It is, of course, to be understood that I do not desire to limit myself to any particular materials, lengths of pipe, sizes of valves, type of valves and so on.

I claim as my invention:—

In a device of the class described, the combination of a tank with a liquid level control structure, comprising a float cage, valve-controlled pipes communicating with the tank at vertically spaced points and with the upper and lower ends of the cage, a cone-shaped, hollow detachable extension communicating with the cage at one side thereof, a shaft journaled in the wall of the extension near its small end, a float in the cage having an arm connected with said shaft, a lever arm mounted on said shaft outside the cage for longitudinal adjustment, a pipe leading from said tank having a valve casing, a valve therein having a projecting stem, a collar on said valve casing mounted for rotatable adjustment around said stem, a fixed arm on said collar, a pivoted arm on the collar, a lever pivoted to the stem and to said pivoted arm, said fixed arm having a bifurcated end receiving and guiding said last lever, a longitudinally extensible element, and means for connecting said element at various points in the lengths of said levers.

Des Moines, Iowa, November 17, 1924.

LYLE W. BROWNE.